US012802462B2

(12) United States Patent
Yokote et al.

(10) Patent No.: US 12,802,462 B2
(45) Date of Patent: Nov. 17, 2026

(54) SYSTEM, METHOD, AND RECORDING MEDIUM

(71) Applicant: NEC Corporation, Tokyo (JP)

(72) Inventors: Toshimichi Yokote, Tokyo (JP); Yosuke Kimura, Tokyo (JP); Chisato Sugawara, Tokyo (JP); Yusuke Mizukoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 159 days.

(21) Appl. No.: 18/714,648

(22) PCT Filed: Dec. 28, 2021

(86) PCT No.: PCT/JP2021/048758
§ 371 (c)(1),
(2) Date: May 30, 2024

(87) PCT Pub. No.: WO2023/127082
PCT Pub. Date: Jul. 6, 2023

(65) Prior Publication Data
US 2025/0029403 A1 Jan. 23, 2025

(51) Int. Cl.
*G06V 20/56* (2022.01)
*G06T 5/50* (2006.01)
*G06T 7/90* (2017.01)

(52) U.S. Cl.
CPC .............. *G06V 20/588* (2022.01); *G06T 5/50* (2013.01); *G06T 7/90* (2017.01); *G06T 2207/10024* (2013.01); *G06T 2207/20221* (2013.01)

(58) Field of Classification Search
CPC ........... G06V 20/588; G06T 7/90; G06T 5/50; G06T 2207/10024; G06T 2207/20221
USPC .......................................................... 348/148
See application file for complete search history.

(56) References Cited

U.S. PATENT DOCUMENTS 9,702,830 B1 * 7/2017 Akselrod ................ H04L 67/12
2012/0203475 A1 * 8/2012 Wilkens .................... B05B 9/06 404/94
2021/0364280 A1 * 11/2021 Miki ....................... G01S 17/04
(Continued)

FOREIGN PATENT DOCUMENTS

JP 2015-118669 A 6/2015
JP 2016-180884 A 10/2016
JP 2017-020303 A 1/2017
(Continued)

OTHER PUBLICATIONS

International Search Report for PCT Application No. PCT/JP2021/048758, mailed on Mar. 22, 2022.
(Continued)

*Primary Examiner* — Allen C Wong

(57) ABSTRACT

A management assistance system according to an aspect of the present disclosure includes: at least one memory configured to store instructions; and at least one processor configured to execute the instructions to: detect a road surface mark and a degree of abrasion of the road surface mark from a road surface image taken of a road surface; determine, based on the degree of abrasion of the road surface mark, whether the road surface mark is to be repainted; and calculate, based on the road surface mark determined to be repainted, an amount of paint to be used for repainting the road surface mark.

19 Claims, 9 Drawing Sheets

(56) References Cited

U.S. PATENT DOCUMENTS

| | | | | |
|---|---|---|---|---|
| 2022/0121862 | A1* | 4/2022 | Stenneth | G05D 1/0246 |
| 2022/0301150 | A1* | 9/2022 | Takeuchi | G01N 21/25 |

FOREIGN PATENT DOCUMENTS

| | | | |
|---|---|---|---|
| JP | 2019-057192 | A | 4/2019 |
| JP | 2019-101499 | A | 6/2019 |
| JP | 2020-021121 | A | 2/2020 |
| JP | 6892974 | B | 6/2021 |
| JP | 6938107 | B | 9/2021 |

OTHER PUBLICATIONS

English translation of Written opinion for PCT Application No. PCT/JP2021/048758, mailed on Mar. 22, 2022.

* cited by examiner

SYSTEM, METHOD, AND RECORDING MEDIUM

This application is a National Stage Entry of PCT/JP2021/048758 filed on Dec. 28, 2021, the contents of all of which are incorporated herein by reference, in their entirety.

TECHNICAL FIELD

The present disclosure relates to a management assistance system and the like.

BACKGROUND ART

For safety on the road and smooth traffic, road signs, road surface marks, and traffic signals are provided on the road. The road surface mark drawn on the road wears over time. Therefore, it is necessary to manage the abrased road surface mark.

PTL 1 discloses a system that recognizes a road surface mark based on reference data related to an image obtained by imaging a traveling road of a vehicle. In PTL 1, when a state in which the similarity with the reference data is lower than a predetermined threshold value continues for a certain period of time, it is assessed that repainting of the road surface mark is necessary.

CITATION LIST

Patent Literature

PTL 1: JP 2015-118669 A

SUMMARY OF INVENTION

Technical Problem

There is a demand for the road surface administrator to know the cost required for repainting the road surface mark.

An object of the present disclosure is to provide a management assistance system or the like that supports calculation of an amount of paint required for repainting a road surface mark.

Solution to Problem

A management assistance system according to the present disclosure includes a detection means configured to detect a road surface mark and a degree of abrasion of the road surface mark from a road surface image in which a road surface is captured, a determination means configured to determine, based on the degree of abrasion of the road surface mark, whether the road surface mark is to be repainted, and a calculation means is configured to calculate, based on the road surface mark determined to be repainted, an amount of paint to be used for repainting the road surface mark.

A management assistance method according to the present disclosure includes detecting a road surface mark and a degree of abrasion of the road surface mark from a road surface image in which a road surface is captured, determining, based on the degree of abrasion of the road surface mark, whether the road surface mark is to be repainted, and calculating, based on the road surface mark determined to be repainted, an amount of paint to be used for repainting the road surface mark.

A program according to the present disclosure causes a computer to execute processing comprising of detecting a road surface mark and a degree of abrasion of the road surface mark from a road surface image in which a road surface is captured, determining, based on the degree of abrasion of the road surface mark, whether the road surface mark is to be repainted, and calculating, based on the road surface mark determined to be repainted, an amount of paint to be used for repainting the road surface mark. The program may be stored in a non-transitory computer-readable recording medium.

Advantageous Effects of Invention

According to the present disclosure, it is possible to support calculation of the amount of paint required for repainting the road surface mark.

EXAMPLE EMBODIMENT

Hereinafter, example embodiments of a management assistance system, a management assistance method, a program, and a non-transitory recording medium that records the program according to the present disclosure will be described in detail with reference to the drawings. The present example embodiment does not limit the disclosed technology.

First Example Embodiment

Figure 1:
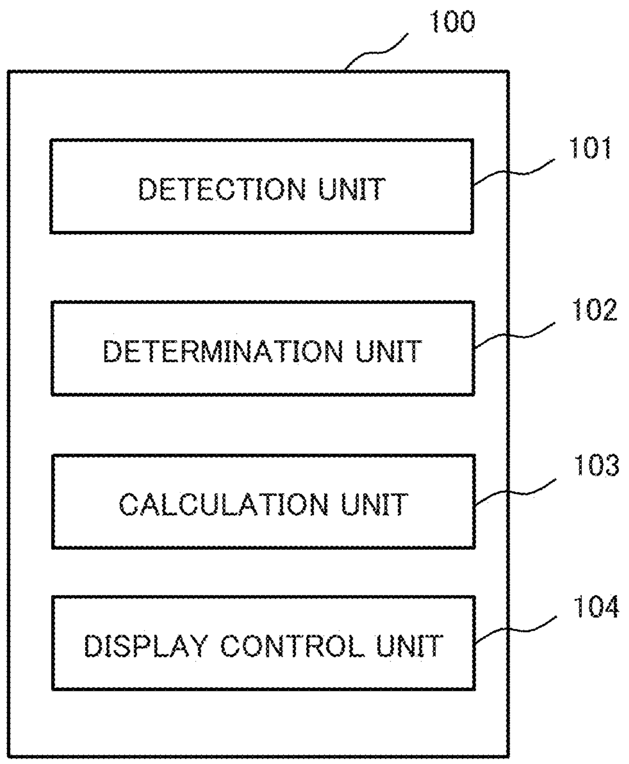
FIG. 1 is a block diagram illustrating a configuration example of a management assistance system.

FIG. 1 is a block diagram illustrating a configuration example of a management assistance system 100 according to an example embodiment. The management assistance system 100 according to the first example embodiment includes a detection unit 101, a determination unit 102, and a calculation unit 103. In the present example embodiment, a case where the management assistance system 100 further includes a display control unit 104 will be described. However, the management assistance system 100 may not include the display control unit 104.

In one example embodiment, the management assistance system 100 is used to manage a road surface mark drawn with paint on a road. The road surface mark is a marking related to passage drawn on a road surface. The road surface mark includes a road mark, a section line, and an out-of-legal mark. There is a plurality of types of road surface marks. Examples of the type of the road surface mark include, but are not limited to, a stop line, a crosswalk, a stop character, a crosswalk notice, prohibition of line crossing for overtaking, a roadway center line, a roadway boundary line, and a roadway outer line.

The road surface targeted by the management assistance system 100 is not limited to a general road on which vehicles and people pass, and includes a test course of a vehicle, a runway, a guide path, and the like of an airport. That is, the management assistance system 100 can widely target the road surface on which the road surface mark is drawn.

The detection unit 101 detects a road surface mark and a degree of abrasion of the road surface mark from a road surface image in which a road surface is captured.

Figure 2:
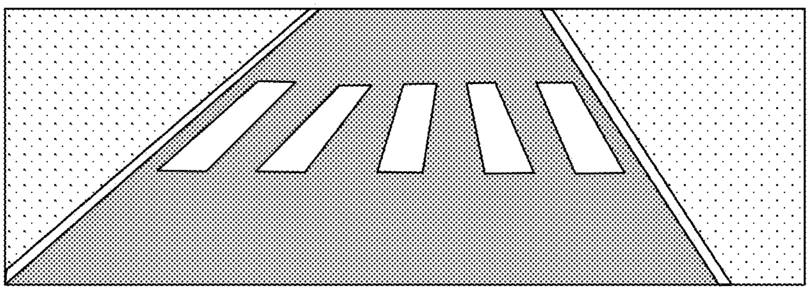
FIG. 2 is a diagram illustrating an example of a road surface image.

FIG. 2 is a diagram illustrating an example of a road surface image obtained by imaging a road on which a car runs. In the road surface image of FIG. 2, a crosswalk, which is an example of a road surface mark, is imaged.

The road surface image is captured by an in-vehicle camera such as a drive recorder. However, the type of the camera is not limited thereto, and various types of cameras may be used. For example, the road surface image may be captured by a camera mounted on another moving body such as a bicycle or a drone, a camera carried by a person, or a fixed camera installed on a road. The road surface image may be captured by a person or may be automatically captured.

Figure 3:
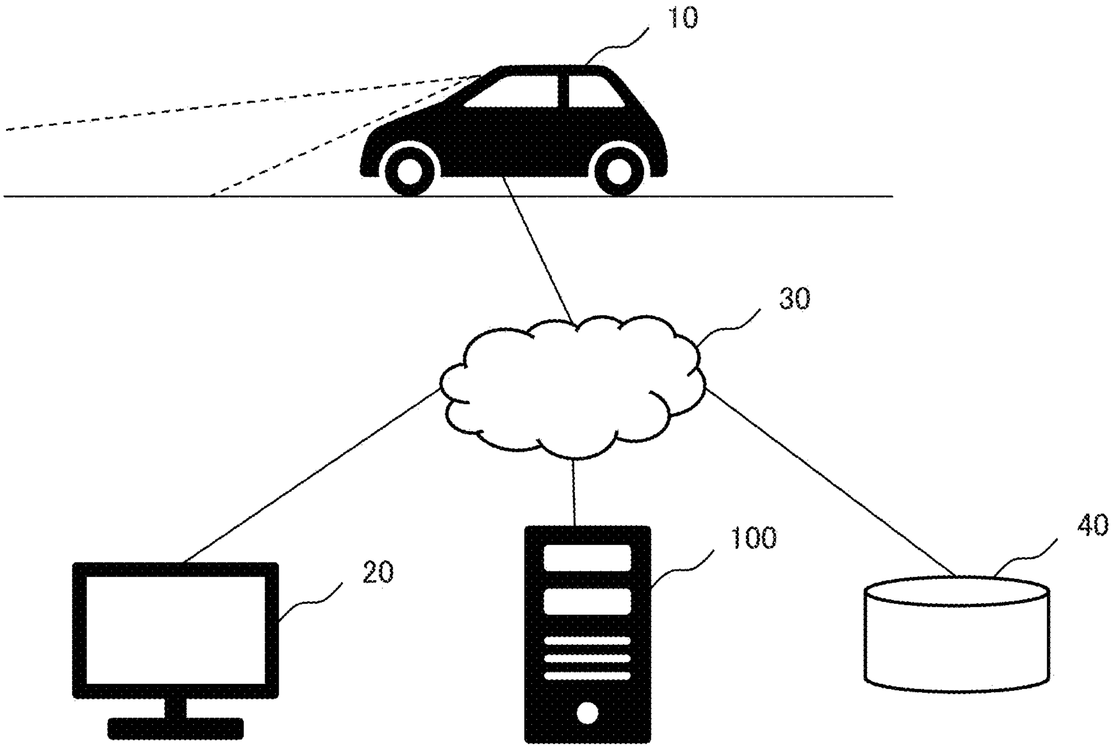
FIG. 3 is a diagram illustrating an example of a device connected to a management assistance system.

FIG. 3 is a diagram illustrating an example of a device communicably connected to the management assistance system 100 in a wired or wireless manner via a communication network 30.

A display 20 is a display, a tablet, or the like connected to a computer. The display control unit 104 included in management assistance system 100 displays various pieces of information on the display 20. Information displayed by the display control unit 104 will be described later.

The road surface image captured by the camera mounted on a vehicle 10 is transmitted to the management assistance system 100. The transmitted road surface image may be stored in a database 40. At this time, the detection unit 101 may acquire the road surface image from database 40. Alternatively, when the management assistance system 100 is communicably connected to an any camera, detection unit 101 may acquire the road surface image from the camera.

The detection unit 101 may acquire a road surface image and position information about a location where the road surface image is captured. The position information includes, for example, latitude and longitude, position information by a global navigation satellite system (GNSS) or a global positioning system (GPS), or a position on a map.

A method of acquiring the position is not particularly limited. A device that receives radio waves from a GNSS satellite may be provided in a moving body such as a camera or a car. For example, the detection unit 101 may acquire the position information about the newly captured road surface image by comparing the road surface image stored in the database in association with the position information with the newly captured road surface image.

Further, the detection unit 101 may acquire the road surface image and a date and time when the road surface image is captured.

The detection unit 101 detects, for example, a portion where a road surface mark is drawn from the acquired road surface image. The detection unit 101 detects the road surface mark by recognizing the color or the shape of the road surface mark by a known image recognition technique, for example. The road surface mark is generally drawn with white or yellow paint. However, the detection unit 101 may also detect road surface marks drawn in blue, green, and other colors.

The detection unit 101 may assess the type of the road surface mark. The method of assessing the type of the road surface mark is not particularly limited. For example, the detection unit 101 refers to a database of shapes of road surface marks, and assesses the type of the road surface mark from the shape of a portion detected as the road surface mark being drawn. For example, the detection unit 101 may execute detection of the road surface mark and determination of the type of the road surface mark as one process. The detection unit 101 may assess the type of the road surface mark by image recognition using a model obtained by machine learning the road surface mark.

The detection unit 101 may use position information about a location where the road surface image is captured in order to assess the type of the road surface mark. For example, the detection unit 101 may refer to a database that stores a position and a type of road surface mark drawn at the position in association with each other. The detection unit 101 may assess the type of the road surface mark included in the road surface image from the position information about the location where the road surface image is captured by referring to the database.

The detection unit 101 may refer to a database that stores a road surface image captured in the past at a location where the road surface image is captured in order to assess the type of the road surface mark. For example, it is assumed that the current degree of abrasion is high and it is difficult to detect the road surface mark from the road surface image. In such a case, the road surface image captured in the past is expected to have a lower degree of abrasion than the current degree of abrasion. Therefore, by referring to the past image, the road surface mark to be included in the road surface image is recognized. Therefore, the accuracy of assessing the type of road surface mark may be improved.

The detection unit 101 detects the degree of abrasion of the road surface mark for the road surface mark whose type has been assessed. The degree of abrasion may be represented by a plurality of stages, for example, "high, medium, low". The degree of abrasion may be represented by a numerical value or a ratio. For example, a state where the road surface mark is not rubbed is assumed to have a degree of abrasion of 0%. For example, it is assumed that the degree of abrasion approaches 100% as the area where the color of the pavement of the road surface can be seen increases in the portion where the road surface mark is drawn. The degree of abrasion may be set in such a way that the value representing the degree of abrasion increases as the proportion of the rubbed portion increases. Alternatively, the degree of abrasion may be a degree of similarity to the shape of the unrubbed road surface mark stored in the database. In this case, the lower the similarity, the higher the degree of abrasion is set.

The method of detecting the degree of abrasion of the road surface mark is not particularly limited. For example, the detection unit 101 may refer to the database of the shape of the road surface mark for each degree of abrasion, and simultaneously execute the determination of the type of road surface mark and the detection of the degree of abrasion. The degree of abrasion may be detected by a model obtained by machine learning the degree of abrasion of the road surface mark.

The detection unit 101 may detect the width and the length of the road in addition to the road surface mark. For example, the detection unit 101 detects the width and the length of the road from the road surface image.

The detection unit 101 may assess whether the road surface marks detected from the plurality of road surface images are the same road surface marks on the same road surface. The detection unit 101 may use the position information to prevent the same road surface mark from the plurality of road surface images from being detected in an overlapping manner. For example, the detection unit 101 omits detection of the road surface mark in the road surface image captured within the predetermined distance. The detection unit 101 may use the date and time when the road surface image was captured in order to prevent overlapping detection. For example, the detection unit 101 may omit detection of the road surface mark for the road surface image continuously captured within a predetermined time.

The determination unit 102 determines whether to repaint the road surface mark based on the degree of abrasion of the road surface mark. The criterion for determining whether to repaint the road surface mark is not particularly limited. For example, the determination unit 102 may determine to repaint the road surface mark when the degree of abrasion exceeds a predetermined threshold value. For example, the determination unit 102 may determine that the road surface mark is not repainted when the degree of abrasion does not exceed the predetermined threshold value.

The unit in which the determination unit 102 determines whether to repaint the road surface mark is appropriately determined. For example, the determination unit 102 may determine whether to perform repainting for each combination with a combination of a line, a figure, a character, or a number as one unit for each unit of the road surface mark having a meaning related to traffic.

The determination unit 102 may determine whether to perform repainting for each partial region of the road surface mark. The partial region may be a region for each component of the road surface mark. The component includes, for example, a line, a figure, a character, or a number constituting the road surface mark. As an example, the determination unit 102 determines whether to perform repainting for each line constituting the road surface mark. Further, the partial region may be a delimited range of the road surface mark. The determination unit 102 may divide the road surface mark into predetermined ranges and determine whether to repaint the road surface mark for each divided range. As an example, the determination unit 102 may determine whether to perform repainting by dividing one line into predetermined ranges.

The determination unit 102 may divide the road into predetermined ranges and determine whether to repaint the road surface mark included in each divided range.

The calculation unit 103 calculates the amount of paint to be used for repainting the road surface mark based on the road surface mark determined to be repainted. For example, the calculation unit 103 may calculate the amount of paint based on the area of the road surface mark determined to be repainted. The area of the road surface mark to be repainted represents the area of the road surface to be repainted on the actual road surface.

The calculation unit 103 acquires the area of the road surface mark to be repainted. The method of acquiring the area is not particularly limited. For example, the calculation unit 103 may calculate the area of the road surface mark to be repainted from the road surface image. For example, the calculation unit 103 converts the number of pixels indicating the road surface mark to be repainted into the area of the road surface mark to be repainted based on a predetermined area of the road surface indicated by one pixel of the road surface image. The calculation unit 103 may calculate the area of the road surface mark after converting the road surface image captured from obliquely above the road surface into an image in which the road surface is captured from above. That is, the calculation unit 103 may calculate the area of the road surface mark after converting the road surface mark captured in a shape apparently different from the actual shape in the road surface image into the actual shape.

The calculation unit 103 may calculate the area of the road surface mark to be repainted from the area determined in advance for each type of road surface mark. As an example, the calculation unit 103 may acquire the number of lines representing the crosswalk from the road surface image. Then, the calculation unit 103 calculates the area from the predetermined area of one line of respective lines representing the crosswalk and the number of lines to be repainted. The calculation unit 103 may further calculate the area of the road surface mark to be repainted from the road surface image with reference to the width or the length of the road. For example, the calculation unit 103 may calculate an area of a crosswalk drawn on a road with reference to the width and the length of the road having the crosswalk.

The amount of paint used for repainting is, for example, the volume or the weight of paint expected to be used. For example, the calculation unit 103 calculates the amount of paint by multiplying the usage amount per unit area determined in advance by the area of the road surface mark.

Alternatively, the calculation unit 103 may calculate the amount of paint based on the amount of paint to be used determined in advance for each type of road surface mark. When the area to be repainted according to the type of road surface mark is predetermined, the amount of paint is calculated from the type of road surface mark. Therefore, the calculation of the amount of paint based on the type of road surface mark is also included in an example of the calculation based on the area of the road surface mark.

Alternatively, the calculation unit 103 may calculate the amount of paint based on the amount of paint used for each predetermined length of the road surface mark. As an example, the length of the section line to be repainted may be acquired from the road surface image. Then, the calculation unit 103 may calculate the amount of paint based on a predetermined amount of paint used per unit length of the section line.

The calculation unit 103 may calculate the amount of paint to be used for each type of paint to be used. As an example, the calculation unit 103 calculates the amount of paint to be used for repainting for each type of color of the paint.

The calculation unit 103 may calculate the sum of the areas to be repainted for a plurality of road surface marks detected not only from one road surface image but also from a plurality of road surface images. Furthermore, the calculation unit 103 may calculate the price of the paint to be used for repainting based on the amount of the paint to be used and the price of the paint per unit amount.

Figure 4:
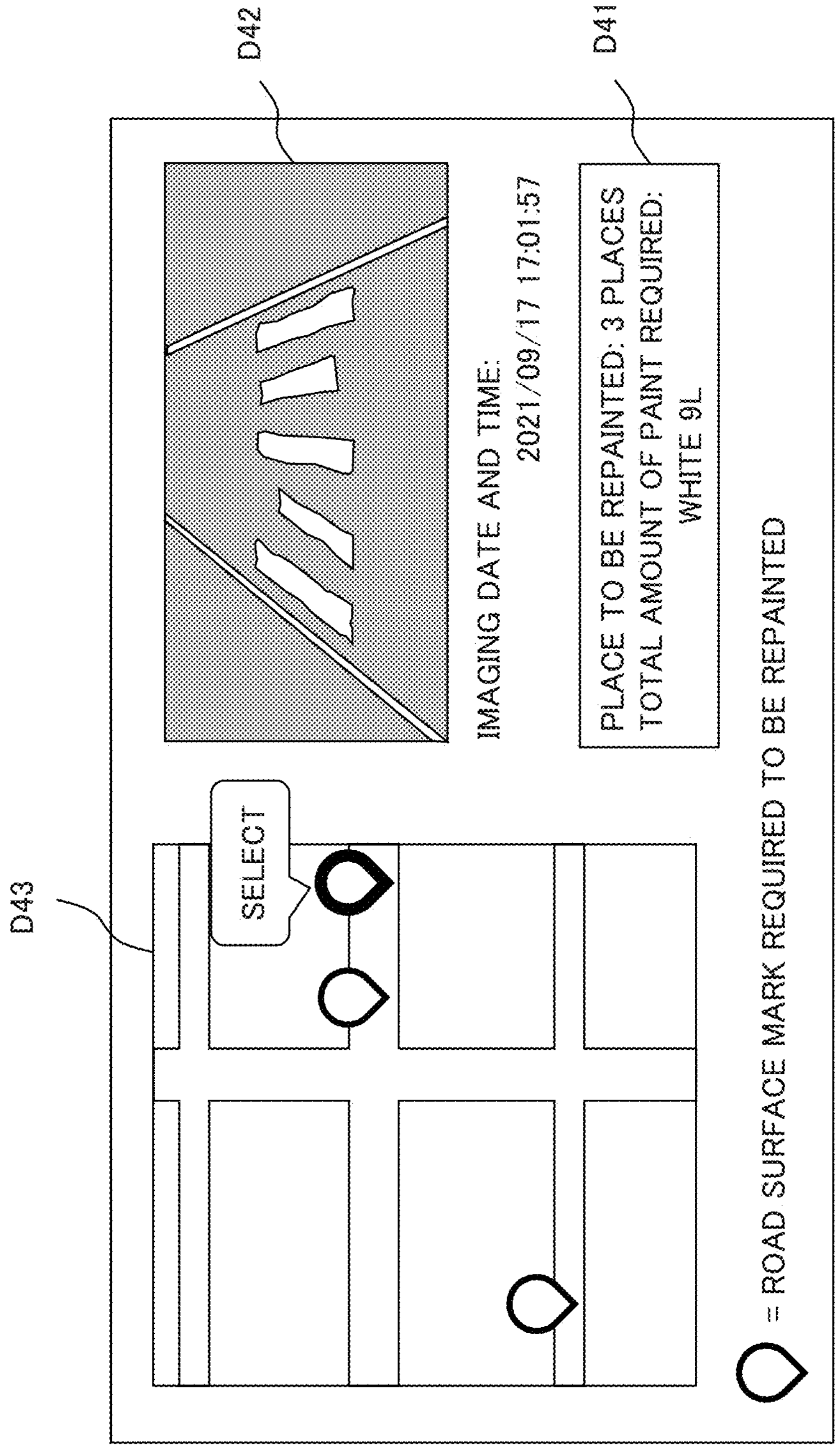
FIG. 4 is a diagram illustrating an example of a screen displayed by a display control unit.

The display control unit 104 displays the calculated amount of paint. FIG. 4 is a diagram illustrating an example of a screen displayed on the display by the display control unit 104. D41 indicates the amount of paint used for repainting. D42 represents a road surface image. A map D43 indicates a location where the road surface image is captured.

As illustrated in D41 of FIG. 4, the display control unit 104 may display the total amount of paint necessary for repainting the road surface mark at the plurality of locations. The display control unit 104 may display the total amount of paint necessary for repainting for the road surface mark detected from one road surface image. The display control unit 104 may display the total amount of paint necessary for repainting for each type of road surface mark.

The display control unit 104 may display the amount of paint to be used for each type of paint to be used. As an example, the display control unit 104 may display the amount of paint for each color to be used. By displaying the amount of paint for each color, the user can prepare as much paint of a necessary color as necessary.

The display control unit 104 may further display information other than the amount of paint. For example, the display control unit 104 may display the road surface image D42 for a selected location on the map D43. The location may be selected by the user or may be automatically selected by the management assistance system 100.

The display control unit 104 may display the position of the road surface mark that is required to be repainted on the map D43. For example, the display control unit 104 acquires position information about a location where the road surface image is captured from the detection unit 101, and plots a location related to the position information on the map D43.

The information displayed by the display control unit 104 is not limited to the above. For example, the display control unit 104 may also plot a road surface mark that is not repainted on the map D43. The display control unit 104 may plot the road surface mark to be repainted and the road surface mark not to be repainted in different modes. For example, a road surface mark to be repainted may be plotted with a red mark, and a road surface mark not to be repainted may be plotted with a green mark.

Further, the display control unit 104 may display the region of the road surface mark determined to be repainted on the road surface image D42. For example, the display control unit 104 superimposes a display indicating the region to be repainted on the road surface image. The display control unit 104 may display, on the map D43, the region of the road having the road surface mark determined to be repainted.

The display control unit 104 may indicate the region of the road surface mark determined to be repainted on the road surface image D42 and the region of the road surface mark determined not to be repainted in different modes. For example, the region to be repainted with the paint may be displayed in red on the screen. A region that is not repainted may be displayed surrounded by a green frame on the screen.

Furthermore, the display control unit 104 may display the price of the paint to be used for repainting the road surface mark.

Figure 5:
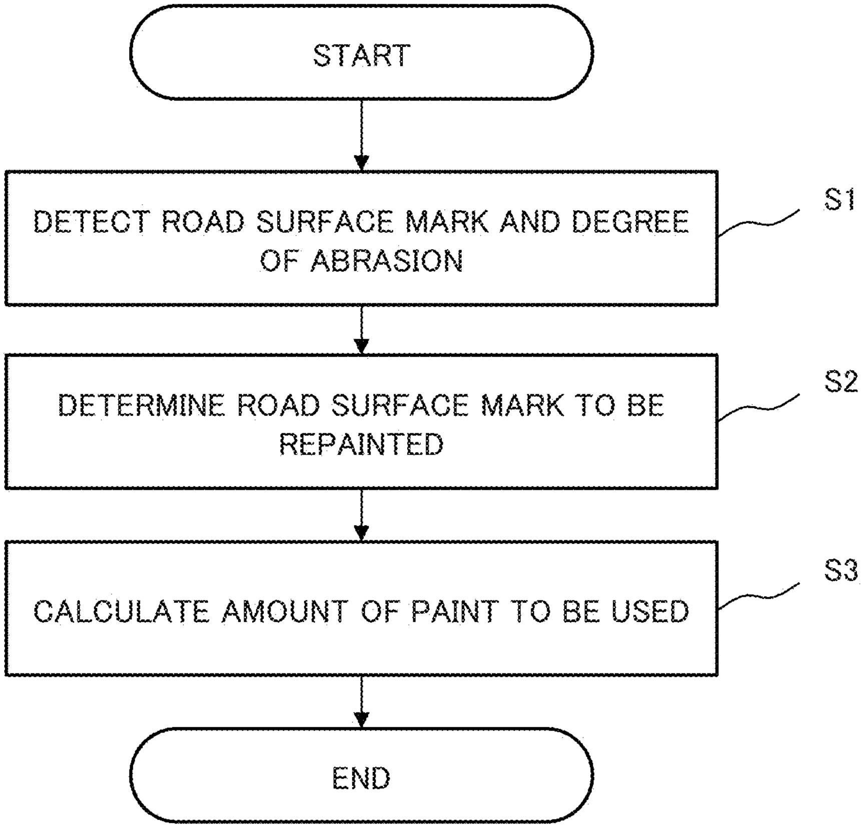
FIG. 5 is a flowchart illustrating an operation example of the management assistance system.

FIG. 5 is a flowchart illustrating an operation example of the management assistance system 100 according to the example embodiment.

The detection unit 101 detects the road surface mark and the degree of abrasion of the road surface mark from the road surface image in which a road surface is captured (step S1). The detection unit 101 delivers the detected road surface mark and the detected degree of abrasion of the road surface mark to the determination unit 102.

The determination unit 102 determines whether to repaint the road surface mark based on the degree of abrasion of the road surface mark (step S2). The determination unit 102 delivers the road surface mark determined to be repainted to the calculation unit 103.

The calculation unit 103 calculates the amount of paint to be used for repainting the road surface mark based on the road surface mark determined to be repainted (step S3). After step S3, the display control unit 104 may display the calculated amount of paint on the display.

As described above, in the present example embodiment, the management assistance system 100 detects the road surface mark and the degree of abrasion of the road surface mark from the road surface image, determines whether to repaint the road surface mark, and calculates the amount of paint to be used for repainting the road surface mark. The management assistance system 100 displays the amount of paint to be used. Therefore, the user can grasp the amount of paint required for repainting the road surface mark.

Second Example Embodiment

As the second example embodiment, a case where the management assistance system 100 receives a change in determination as to whether to repaint the road surface mark from the user will be described.

Figure 6:
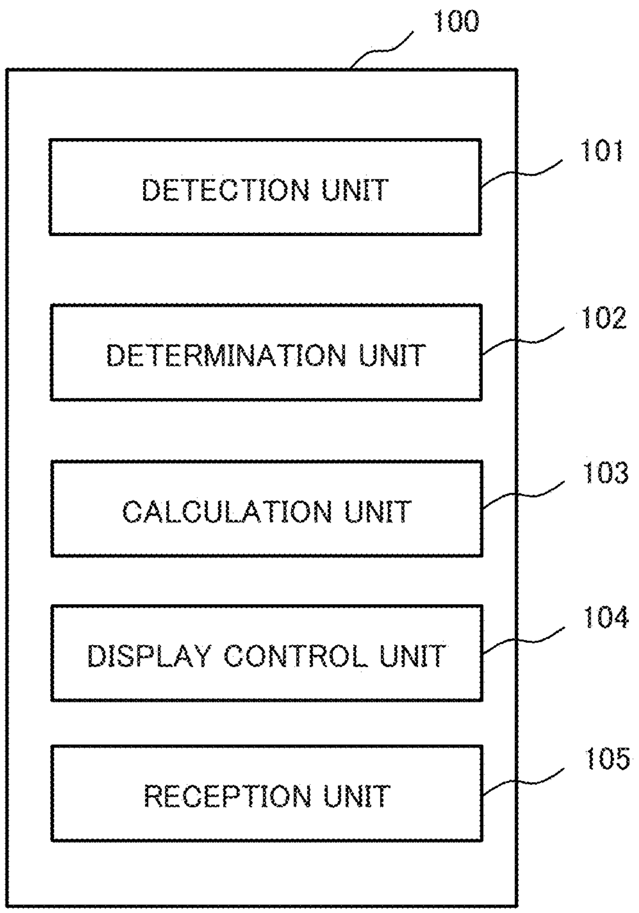
FIG. 6 is a block diagram illustrating another configuration example of the management assistance system.

FIG. 6 is a block diagram illustrating a configuration example of the management assistance system 100 according to an example embodiment. The management assistance system 100 according to the second example embodiment includes the detection unit 101, the determination unit 102, the calculation unit 103, the display control unit 104, and a reception unit 105. Detailed description of the configurations regarding the configurations of the detection unit 101, the determination unit 102, the calculation unit 103, and the display control unit 104 according to the second example embodiment same as those of the first example embodiment will be omitted.

Figure 7:
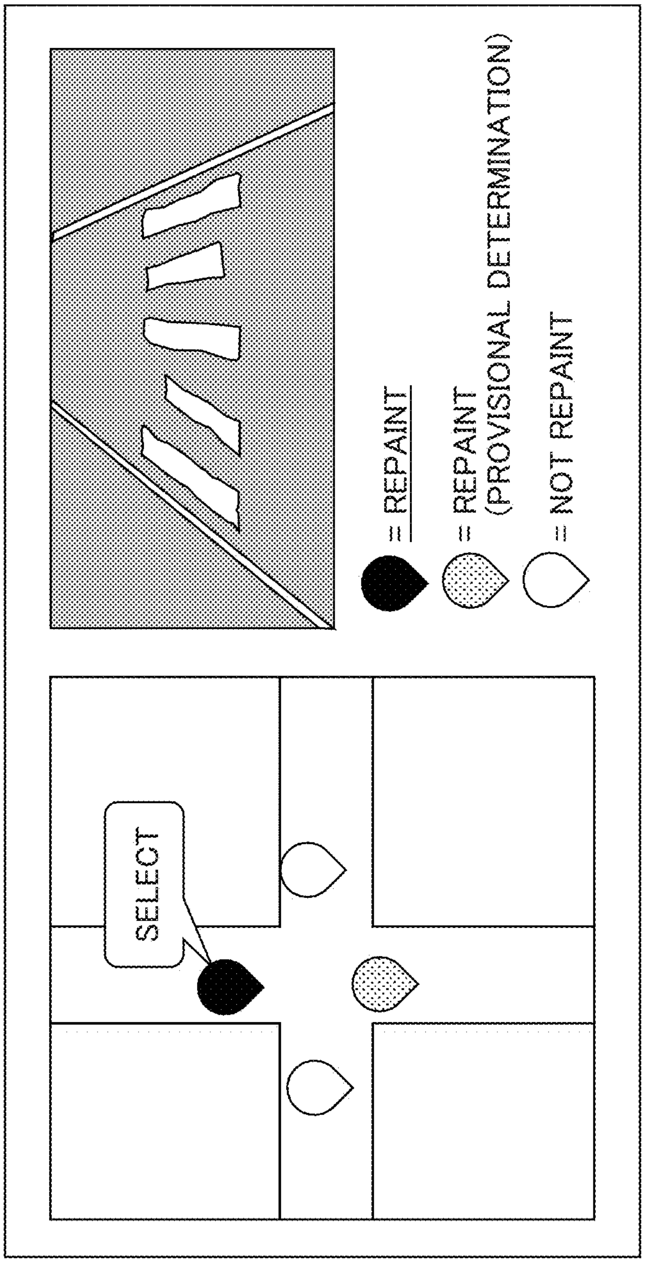
FIG. 7 is a diagram illustrating an example of a screen displayed by a display control unit.
Figure 8:
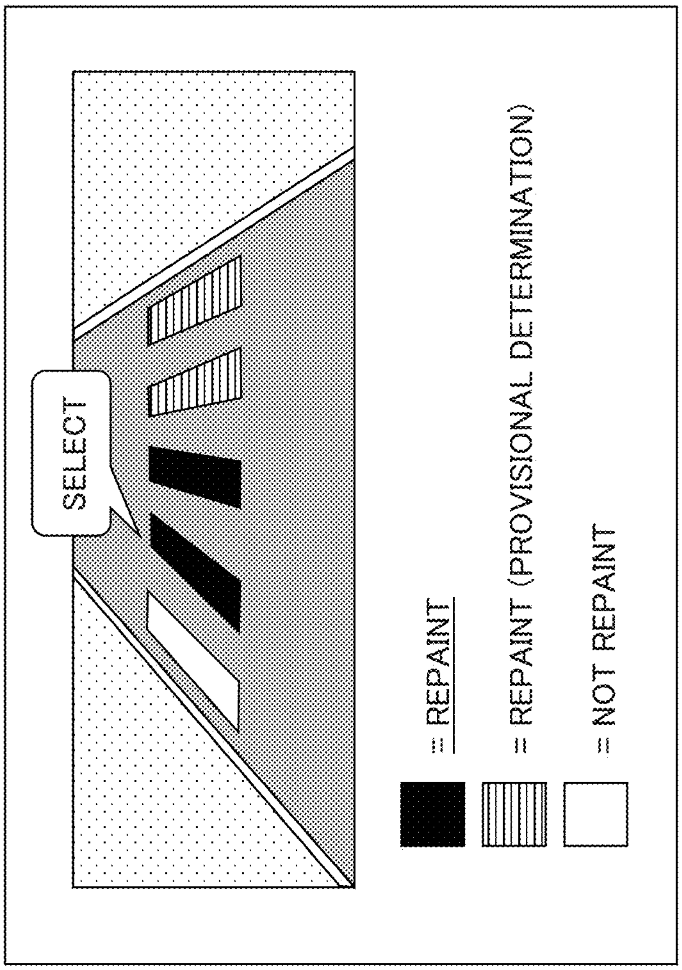
FIG. 8 is a diagram illustrating an example of a screen displayed by a display control unit.

The display control unit 104 according to the second example embodiment displays a result of determining whether to repaint the road surface mark. The display control unit 104 selectively displays the road surface mark. FIG. 7 is a diagram illustrating an example of a screen on which a result of determining whether to perform repainting is displayed on a map. FIG. 8 is a diagram illustrating an example of a screen on which a result of determining whether to perform repainting is displayed on the road surface image.

In the second example embodiment, the determination unit 102 may output a certainty factor of determination as to whether to repaint the road surface mark. The certainty factor represents the validity of the determination. When the certainty factor is low, it is preferable for the user to check the road surface image. In a case where the degree of abrasion is close to the criterion of whether the road surface mark is to be repainted or in a case where it is difficult to detect the road surface mark, the certainty factor is low. The determination unit 102 may acquire validity of the detection result from the detection unit 101 and obtain the certainty factor based on the validity of the detection result.

The determination unit 102 may temporarily determine a road surface mark having a low certainty factor as a road surface mark to be repainted. The display control unit 104 may display the road surface mark having a low certainty factor of determination as to whether to perform repainting in a mode different from modes of other road surface marks. For example, the display control unit 104 may display a road surface mark having a high certainty factor of repainting determination as a red mark and a road surface mark not to be repainted as a green mark, and a road surface mark having a low certainty factor as a yellow mark on the map.

The reception unit 105 receives an input from an input device such as a mouse or a keyboard. For example, the reception unit 105 receives the selection of the road surface mark. The unit for receiving the selection is appropriately determined as in the unit for determining whether to perform repainting, which is described in the first example embodiment. That is, the reception unit 105 may receive the selection for each unit of the road surface mark having a meaning related to traffic or for each partial region of the road surface mark.

The reception unit 105 may receive the selection of the road surface mark present at the location on the map designated by the user. Alternatively, the selection may be received of a region of the road surface image designated by the user.

For example, the reception unit 105 receives the selection of the road surface mark in response to the click of the screen by the user. The user refers to the displayed road surface image for the selected road surface mark, and determines whether to repaint the road surface mark. Then, the user may determine that the road surface mark determined to be repainted is not repainted. The user may determine that the road surface mark determined not to be repainted is repainted.

The determination unit 102 changes the determination as to whether to repaint the road surface mark in accordance with the designation of the road surface mark to be repainted by the user. For example, the determination unit 102 changes the determination in accordance with an instruction from the user.

The calculation unit 103 calculates the amount of paint to be used for repainting the road surface mark based on the change of the determination. Furthermore, the calculation unit 103 may calculate the price of the paint to be used for repainting. For example, the calculation unit 103 calculates the price of the paint to be used for repainting by multiplying the amount of paint to be used for repainting by the price of the paint per unit amount.

Figure 9:
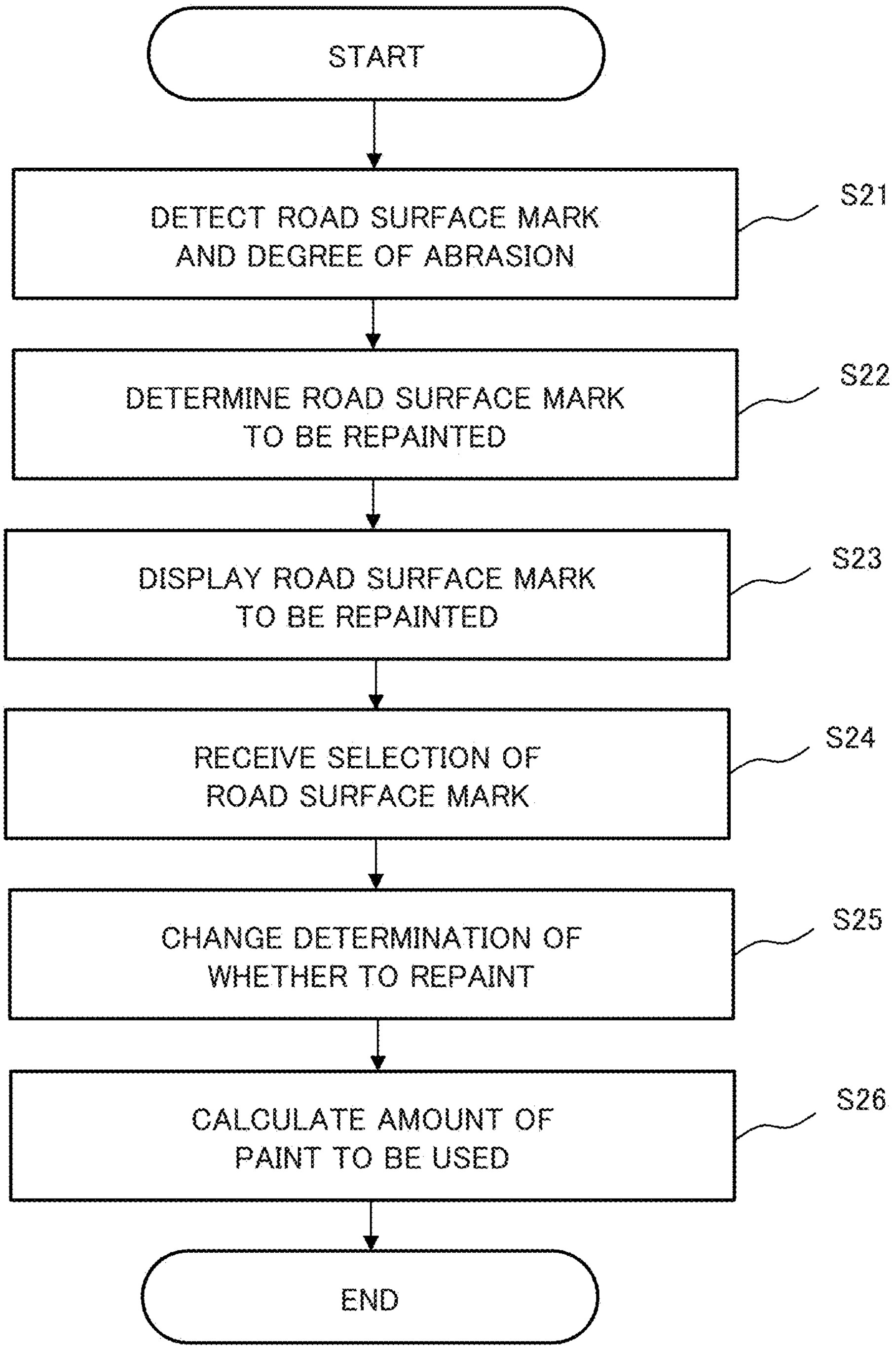
FIG. 9 is a flowchart illustrating another operation example of the management assistance system.
Figure 10:
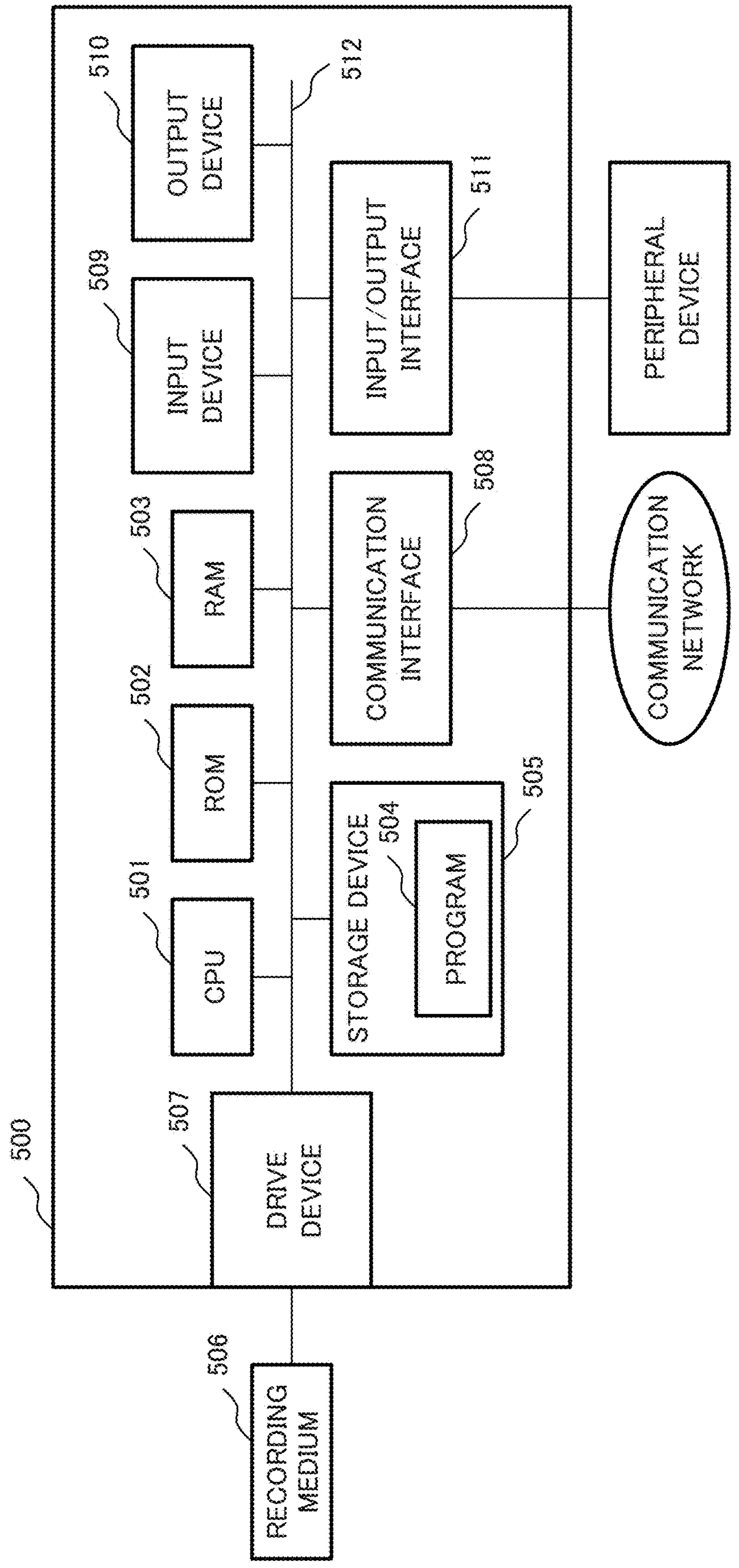
FIG. 10 is a block diagram illustrating an example of a hardware configuration of a computer.

FIG. 9 is a flowchart illustrating an operation example of the management assistance system 100 according to the second example embodiment.

The detection unit 101 detects the road surface mark and the degree of abrasion of the road surface mark from the road surface image in which a road surface is captured (step S21). The detection unit 101 delivers the detected road surface mark and the detected degree of abrasion of the road surface mark to the determination unit 102.

The determination unit 102 determines whether to repaint the road surface mark based on the degree of abrasion of the road surface mark (step S22). The determination unit 102 notifies the calculation unit 103 and the display control unit 104 of the road surface mark determined to be repainted.

The display control unit 104 displays, on the display, the determination as to whether to repaint the road surface mark (step S23). The reception unit 105 receives the selection of the road surface mark from the user (step S24). In step S24, the reception unit 105 may receive, from the user, an instruction to change the determination as to whether to repaint the road surface mark.

Next, in accordance with the result of receiving the selection in step S24, the determination unit 102 changes the determination as to whether to repaint the road surface mark (step S25). After step S25, the display control unit 104 may display the result of determining whether to repaint the road surface mark based on the change in the determination.

The calculation unit 103 calculates the amount of paint to be used for repainting the road surface mark based on the area of the road surface mark determined to be repainted (step S26). After step S26, the display control unit 104 may display the calculated amount of paint on the display. In step S26, the calculation unit 103 may calculate the price of the paint to be used for repainting.

The calculation unit 103 may also calculate the amount of paint to be used after step S22 and before step S24. That is, the calculation unit 103 may recalculate the amount of paint according to the change in step S26.

As described above, in the present example embodiment, the management assistance system 100 changes the determination as to whether to repaint the road surface mark. Therefore, the user can grasp the amount of paint to be used after adjusting the road surface mark to be repainted according to the budget and the degree of abrasion.

Modifications

The example embodiment is not limited to the example described above, and various modifications can be made. The management assistance system 100 according to each of the above example embodiments can be modified as follows, for example.

The determination unit 102 may further determine the road surface mark to be repainted based on the budget. The criterion for determining whether to repaint the road surface mark may be set according to the budget.

For example, when the amount of paint calculated by the calculation unit 103 exceeds a preset budget, the criterion of the degree of abrasion according to which the road surface mark is determined to be repainted may be changed to be higher. The determination unit 102 may redetermine the road surface mark to be repainted based on the changed criterion.

The determination unit 102 may determine the priority of the road surface mark determined to be repainted. The priority indicates an order in which the user should perform repainting work. The display control unit 104 may display the priority of the road surface mark.

The priority may be determined based on the traffic situation regarding the road. The traffic situation related to the road includes whether a traffic accident or a traffic violation occurs, a traffic volume, and a pedestrian volume, but is not limited thereto. For example, the priority of a road surface mark drawn on a road with a large traffic volume is determined to be high.

The determination unit 102 may determine the priority first and determine the road surface mark to be repainted based on the determined priority. When the budget is set, for example, the area of the road surface mark that can be repainted within the budget can be calculated based on the price of paint per unit amount. Therefore, the determination unit 102 may determine, in descending order of priority, the range that can be repainted with the amount of paint that falls within the budget as the road surface mark to be repainted.

The determination unit 102 may determine whether to repaint the road surface mark for the road surface mark detected from the road surface included in the predetermined area. The range of the predetermined area is appropriately determined. For example, a range in which repainting is managed by the user may be determined as the predetermined area. A range selected by the user on the map may be determined as the predetermined area. The display control unit 104 included in the management assistance system 100 displays a map. The reception unit 105 may receive selection as to in which range of the map the road surface mark is to be repainted. The reception unit 105 may display the names of the plurality of predetermined areas in a list and receive selection as to in which area displayed in the list the road surface mark is to be repainted.

The calculation unit 103 calculates the amount of paint to be used for repainting the road surface mark in the determined predetermined area.

Hardware Configuration

In each of the above-described example embodiments, each component of the management assistance system 100 indicates a block of a functional unit. Some or all of the components of the management assistance system 100 may be achieved by an any combination of the computer 500 and the program.

The detection unit 101, the determination unit 102, the calculation unit 103, the display control unit 104, and the reception unit 105 may be achieved by one device. Alternatively, the detection unit 101, the determination unit 102, the calculation unit 103, the display control unit 104, and the reception unit 105 may be achieved by a plurality of devices.

FIG. 9 is a block diagram illustrating an example of a hardware configuration of the computer 500. Referring to FIG. 9, the computer 500 includes, for example, a central processing unit (CPU) 501, a read only memory (ROM) 502, a random access memory (RAM) 503, a program 504, a storage device 505, a drive device 507, a communication interface 508, an input device 509, an input/output interface 511, and a bus 512.

The program 504 includes an instruction for implementing each function of the management assistance system 100. The program 504 is stored in advance in the ROM 502, the RAM 503, and the storage device 505. The CPU 501 achieves each function of the management assistance system 100 by executing a command included in the program 504. For example, the CPU 501 of the management assistance system 100 executes a command included in the program 504 to implement the function of the management assistance system 100. The RAM 503 may store data processed by each function of the management assistance system 100. For example, the road surface image may be stored in the RAM 503 of the computer 500.

The drive device 507 reads and writes the recording medium 506. The communication interface 508 provides an interface with a communication network. The input device 509 is, for example, a mouse, a keyboard, or the like, and receives an input of information from a user or the like. The output device 510 is, for example, a display, to output (displays) information to a user or the like. The input/output interface 511 provides an interface with a peripheral device. The bus 512 connects the components of the hardware. The program 504 may be supplied to the CPU 501 via a communication network, or may be stored in the recording medium 506 in advance, read by the drive device 507, and supplied to the CPU 501.

The hardware configuration illustrated in FIG. 9 is an example, and other components may be added or some components may not be included.

There are various modifications of the method of implementing the management assistance system 100. For example, the management assistance system 100 may be achieved by an any combination of a computer and a program different for each component. A plurality of components included in the management assistance system 100 may be achieved by an any combination of one computer and a program.

Some or all of the components of the management assistance system 100 may be achieved by general-purpose or dedicated circuitry including a processor or the like, or a combination thereof. These circuits may be configured by a single chip or may be configured by a plurality of chips connected via a bus. Some or all of the components of the management assistance system 100 may be achieved by a combination of the above-described circuit and the like and a program.

In a case where some or all of the components of the management assistance system 100 are achieved by a plurality of computers, circuits, and the like, the plurality of computers, circuits, and the like may be disposed in a centralized manner or in a distributed manner.

At least part of the management assistance system 100 may be provided in a software as a service (SaaS) format. That is, at least part of the functions for implementing the management assistance system 100 may be executed by software executed via a network.

While the present disclosure has been particularly shown and described with reference to exemplary embodiments thereof, the present disclosure is not limited to these embodiments. It will be understood by those of ordinary skill in the art that various changes in form and details may be made therein without departing from the spirit and scope of the present disclosure as defined by the claims. The configurations in the respective example embodiments can be combined with each other without departing from the scope of the present disclosure.

Some or all of the above example embodiments may be described as the following Supplementary Notes, but are not limited to the following.

[Supplementary Note 1]

A management assistance system including

- a detection means configured to detect a road surface mark and a degree of abrasion of the road surface mark from a road surface image in which a road surface is captured,
- a determination means configured to determine, based on the degree of abrasion of the road surface mark, whether the road surface mark is to be repainted, and
- a calculation means is configured to calculate, based on the road surface mark determined to be repainted, an amount of paint to be used for repainting the road surface mark.

[Supplementary Note 2]

The management assistance system according to Supplementary Note 1, further including

- a display control means configured to display a region of the road surface mark determined to be repainted.

[Supplementary Note 3]

The management assistance system according to Supplementary Note 2, wherein

- the display control means superimposes a display indicating the region of the road surface mark determined to be repainted on the road surface image.

[Supplementary Note 4]

The management assistance system according to any one of Supplementary Notes 1 to 3, wherein

- the detection means detects a color of the road surface mark, and wherein
- the calculation means calculates an amount of paint to be used for repainting the road surface mark for each of the colors.

[Supplementary Note 5]

The management assistance system according to any one of Supplementary Notes 1 to 4, wherein the determination means determines whether to perform repainting for each partial region of the road surface mark.

[Supplementary Note 6]

The management assistance system according to any one of Supplementary Notes 1 to 5, wherein the determination means determines a priority of repainting the road surface mark.

[Supplementary Note 7]

The management assistance system according to any one of Supplementary Notes 1 to 6, wherein the determination means further determines the road surface mark to be repainted based on a budget.

[Supplementary Note 8]

The management assistance system according to Supplementary Note 7, wherein the determination means further determines the road surface mark to be repainted based on a priority.

[Supplementary Note 9]

The management assistance system according to any one of Supplementary Notes 1 to 8, wherein the determination means determines whether to repaint the road surface mark for the road surface mark detected from a road surface included in a predetermined area, and wherein the calculation means calculates an amount of paint to be used for repainting the road surface mark in the predetermined area.

[Supplementary Note 10]

The management assistance system according to any one of Supplementary Notes 1 to 9, wherein the determination means changes determination as to whether to repaint the road surface mark in accordance with designation by a user of the road surface mark to be repainted.

[Supplementary Note 11]

A management assistance method including detecting a road surface mark and a degree of abrasion of the road surface mark from a road surface image in which a road surface is captured, determining, based on the degree of abrasion of the road surface mark, whether the road surface mark is to be repainted, and calculating, based on the road surface mark determined to be repainted, an amount of paint to be used for repainting the road surface mark.

[Supplementary Note 12]

A recording medium non-transiently recording a program for causing a computer to execute processing comprising detecting a road surface mark and a degree of abrasion of the road surface mark from a road surface image in which a road surface is captured, determining, based on the degree of abrasion of the road surface mark, whether the road surface mark is to be repainted, and calculating, based on the road surface mark determined to be repainted, an amount of paint to be used for repainting the road surface mark.

REFERENCE SIGNS LIST

100 management assistance system

101 detection unit

102 determination unit

103 calculation unit

104 display control unit

105 reception unit

10 vehicle

20 display

30 communication network

40 database

What is claimed is:

1. A system comprising:

at least one memory configured to store instructions; and at least one processor configured to execute the instructions to:

detect a road surface mark and a degree of abrasion of the road surface mark from a road surface image taken of a road surface;

determine the road surface mark is to be repainted in a case where the degree of abrasion of the road surface mark exceeds a threshold value;

before repainting, calculate, based on the road surface image, an actual area of the road surface mark determined to be repainted;

before repainting, calculate, by multiplying the usage amount per unit area by the actual area of the road surface mark determined to be repainted, an amount of paint to be used for repainting the road surface mark;

calculate a price of the paint to be used for repainting based on the calculated amount of the paint and a price of the paint per unit amount;

compare the calculated price of the paint with a preset budget for repainting;

change, when the calculated price of the paint exceeds the preset budget, the threshold value of a degree of abrasion to be higher; and redetermine the road surface mark to be repainted based on the changed threshold value.

2. The system according to claim 1, wherein the at least one processor is further configured to execute the instructions to:

display a region of the road surface mark determined to be repainted.

3. The system according to claim 2, wherein the at least one processor is further configured to execute the instructions to:

superimpose a display indicating the region of the road surface mark determined to be repainted on the road surface image.

4. The system according to claim 1, wherein the at least one processor is further configured to execute the instructions to:

detect a color of the road surface mark; and calculate an amount of paint to be used for repainting the road surface mark for each of the colors.

5. The system according to claim 1, wherein the at least one processor is further configured to execute the instructions to:

determine whether to perform repainting for each partial region of the road surface mark.

6. The system according to claim 1, wherein the at least one processor is further configured to execute the instructions to:

determine a priority of repainting the road surface mark.

7. The system according to claim 1, wherein the at least one processor is further configured to execute the instructions to:

determine the road surface mark to be repainted based on a priority.

8. The system according to claim 1, wherein the at least one processor is further configured to execute the instructions to:

determine whether to repaint the road surface mark for the road surface mark detected from a road surface included in a predetermined area; and calculate an amount of paint to be used for repainting the road surface mark in the predetermined area.

9. The system according to claim 1, wherein the at least one processor is further configured to execute the instructions to:

change determination as to whether to repaint the road surface mark in accordance with user's designation of the road surface mark to be repainted.

10. A method comprising:

detecting a road surface mark and a degree of abrasion of the road surface mark from a road surface image taken of a road surface;

determining the road surface mark is to be repainted in a case where the degree of abrasion of the road surface mark exceeds a threshold value;

before repainting, calculating, based on the road surface image, an actual area of the road surface mark determined to be repainted;

before repainting, calculating, by multiplying the usage amount per unit area by the actual area of the road surface mark determined to be repainted, an amount of paint to be used for repainting the road surface mark;

calculate a price of the paint to be used for repainting based on the calculated amount of the paint and a price of the paint per unit amount;

compare the calculated price of the paint with a preset budget for repainting;

change, when the calculated price of the paint exceeds the preset budget, the threshold value of a degree of abrasion to be higher; and redetermine the road surface mark to be repainted based on the changed threshold value.

11. The method according to claim 10 further comprising:

displaying a region of the road surface mark determined to be repainted.

12. The method according to claim 11 further comprising:

superimposing a display indicating the region of the road surface mark determined to be repainted on the road surface image.

13. The method according to claim 10 further comprising:

detecting a color of the road surface mark; and calculate an amount of paint to be used for repainting the road surface mark for each of the colors.

14. The method according to claim 10 further comprising:

determining whether to perform repainting for each partial region of the road surface mark.

15. A non-transitory recording medium recording a program for causing a computer to execute processing comprising:

detecting a road surface mark and a degree of abrasion of the road surface mark from a road surface image taken of a road surface;

determining the road surface mark is to be repainted;

before repainting, calculating, based on the road surface image, an actual area of the road surface mark determined to be repainted;

before repainting, calculating, by multiplying the usage amount per unit area by the actual area of the road surface mark determined to be repainted, an amount of paint to be used for repainting the road surface mark;

calculate a price of the paint to be used for repainting based on the calculated amount of the paint and a price of the paint per unit amount;

compare the calculated price of the paint with a preset budget for repainting;

change, when the calculated price of the paint exceeds the preset budget, the threshold value of a degree of abrasion to be higher; and redetermine the road surface mark to be repainted based on the changed threshold value.

16. The recording medium according to claim 15 recording the program for causing the computer to execute processing further comprising:

displaying a region of the road surface mark determined to be repainted.

17. The recording medium according to claim 16 recording the program for causing the computer to execute processing further comprising:

superimposing a display indicating the region of the road surface mark determined to be repainted on the road surface image.

18. The recording medium according to claim 15 recording the program for causing the computer to execute processing further comprising:

detecting a color of the road surface mark; and calculate an amount of paint to be used for repainting the road surface mark for each of the colors.

19. The recording medium according to claim 15 recording the program for causing the computer to execute processing further comprising:

determining whether to perform repainting for each partial region of the road surface mark.

* * * * *